Aug. 8, 1967   C. LINDSTRÖM   3,334,411
METHOD OF STACKING A POWER PLANT GENERATOR ROTOR RIM
Filed March 19, 1963   2 Sheets-Sheet 1
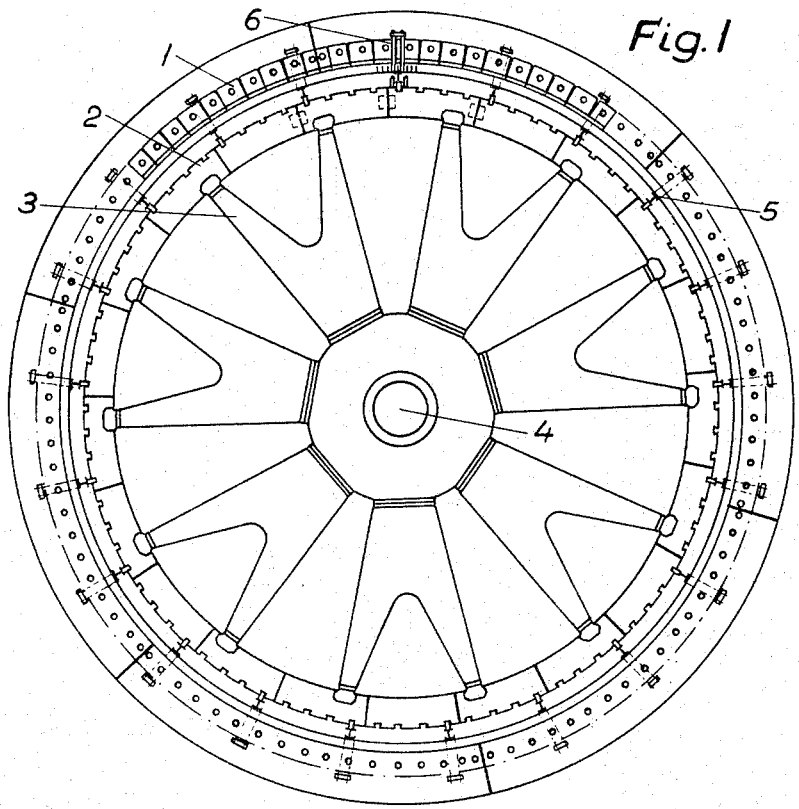
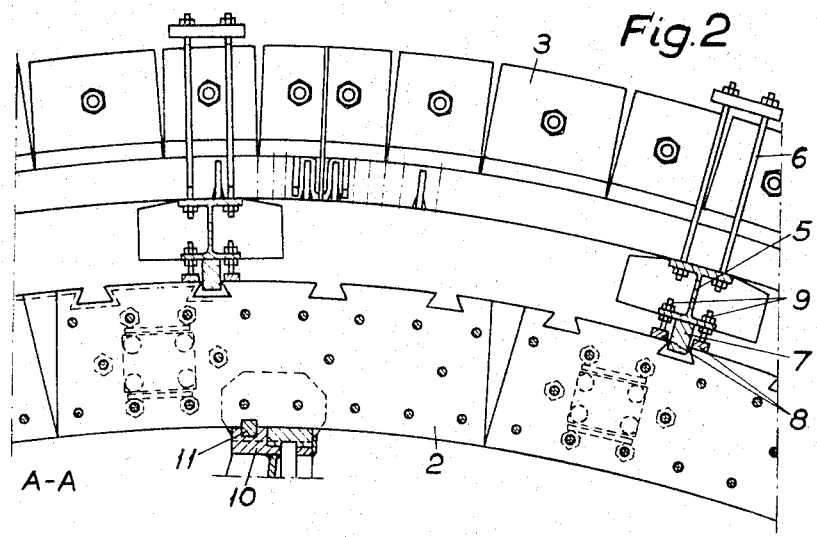
INVENTOR.
Carl Lindström
BY
Bailey, Stephens + Huettig
ATTORNEYS

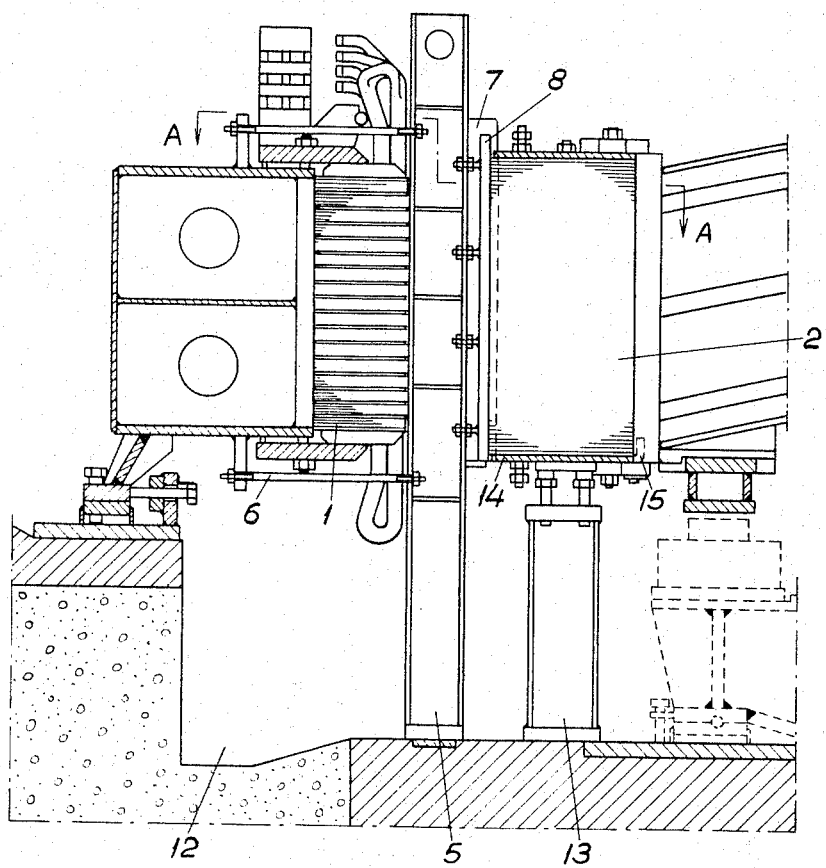

United States Patent Office 3,334,411
Patented Aug. 8, 1967

3,334,411
METHOD OF STACKING A POWER PLANT GENERATOR ROTOR RIM
Carl Lindström, Vasteras, Sweden, assignor to Allmänna Svenska Elektriska Aktiebolaget, Vasteras, Sweden, a corporation of Sweden
Filed Mar. 19, 1963, Ser. No. 266,320
Claims priority, application Sweden, Mar. 19, 1962, 3,018/62
4 Claims. (Cl. 29—598)

The rotor rim of a large generator is stacked and completed in the power station machine hall when for example its diameter and weight are so large that it cannot be transported in finished condition from workshop to erection site. In the machine hall the rotor spider which has been fabricated in the workshop in two or more parts are first assembled on the assembly site. Afterwards the rim is built up of sheet segments around the rotor spider, said segments being punched out in the workshop with great accuracy and having a number of holes for vertical dowel pins and clamping bolts. In addition on the inner edge of the segments are slots for the so-called locating keys, which are fixed vertically on the outside of each arm on the rotor spider. By means of these locating keys and the dowel pins previously mentioned, the sheet segments of the rotor rim may be positioned correctly so that a circular magnet rim of desired height is obtained. During the whole stacking procedure therefore the rotor spider is used as a fixture for the rotor rim. When assembly of the rotor rim has been completed the rim is secured by suitable means to the rotor spider, after which the poles are mounted on said rotor rim. After completion of the entire rotor it is transported to its ultimate location in the generator pit by means of cranes.

This method of stacking of the rotor rim has thus the disadvantage that it demands a special assembly site in the machine hall. For power station generators of relatively large diameter this site will occupy a proportionally large part of the machine hall, particularly if this is intended for only one generator.

Another disadvantage is that for transport of the rotor from erection site to generator pit cranes and devices are necessary, whose capacity could be decreased considerably if lifting of the complete rotor could be eliminated.

According to the present invention the above-mentioned disadvantages are avoided by the rotor rim being stacked on the working site of the generator in the generator pit, a fixture being used which facilitates aligning of the rotor rim without obstructing that part of the generator pit which is encircled by the rotor rim.

One of the main reasons for not previously employing this method of stacking the rotor rim in the generator pit has been that it was considered to necessitate the use of the rotor spider as a fixture when stacking the rotor rim. The turbine pit would thereby be obstructed by the rotor spider and much of the advantages which could be gained by stacking the rotor rim in the generator pit would be offset by, inter alia, a longer erection time for the whole power unit. According to the invention a fixture is used which leaves the turbine pit free and therefore permits the turbine erection to be carried out simultaneously with the stacking of the rotor rim.

According to an embodiment of the invention the generator stator is used as a fixture for the rotor ring. Adjustable straight edges are attached to the beam surfaces facing towards the axis of the generator, said straight edges being trued vertically and adjusted to be concentric with said axis and located at a radial distance appropriate to the outer diameter of the rotor rim. When stacking the rim the segments are laid with their outer edges abutting the straight edges which shall have been adjusted within one tenth of a millimeter to form a circular path around the axis of the power unit.

According to another embodiment it is also feasible to use a base-ring of heavy plate as a fixture and permanent support for the rotor rim. This base ring is provided with tongues facing the rotor centre and, for obtaining good accuracy in alignment, the surfaces of the base ring and the bosses facing the rotor rim are machined, e.g. by turning. The invention is best understood with reference to the accompanying figures, which show examples of different applications of the invention.

FIGURE 1 shows the generator seen from above after completion of the rim stacking operation using the stator as fixture and with the rotor spider located in position. FIGURE 2 is FIGURE 1 in detail. FIGURE 3 shows a section of the stator and the rotor rim.

In FIGURE 1, 1 indicates the stator core and 2 the rotor rim. The rotor rim is supported by the rotor spider, the arms 3 of which are fixed to the rotor rim 2. The rotor spider is intended to rotate around the axis 4 of the power unit. On the inside of the stator beams 5 are arranged. The beams are fixed to the stator core by means of long bolts 6.

FIGURE 2 shows a detailed sketch of the erection of the beams seen from above. Each beam is provided with a vertical guide bar 7 facing the rotor rim and intended to fit into a dovetail slot in the outer edge of the rotor rim, and with straight edges 8, which by means of bolts 9 may be trued vertically and adjusted to lie on a circle round axis 4. 10 is a part of a cut-away spider arm, in the outer surface of which a slot is cut out, which is located opposite a corresponding slot in the inner edge of the rotor rim. In the slot wedges 11 are firmly driven.

FIGURE 3 shows a part of the generator sectioned along a vertical plane through its axis. 12 indicates the generator pit, in which the stator 1 is erected. Inside the stator the rotor rim 2 is supported on a number of assembly blocks 13. 5 indicates one of the beams which form the framework for the assembly fixture for the rotor rim. 7 is the guide bar and 8 one of the adjustable straight edges on this beam. At the bottom of the rotor rim a heavy plate base ring 14 is arranged.

The adjustable straight edges 8 are trued vertically with the aid of a right angle spirit level and a special alignment gauge for obtaining the correct radial distance from axis 4. When positioning the rim segments in the rotor rim the outer edges of these are laid abutting the straight edges which are adjusted so that they lie, within one tenth of a millimeter, on a true circle around axis 4. The position of the segments in the tangential direction is also defined by straight edges as well as by the guide bars 7 which engage in dovetail slots in the periphery of the rotor rim provided for fixing of the poles.

In order to make full use of the advantage of stacking the rotor rim directly at the final site where the generator is to be placed, the rotor spider must be capable of being quickly secured to or freed from the rotor rim. This is achieved by employing the method of prestressing the rotor spider in the rotor rim by means of compression rods, which is mentioned in the previously filed application of S. Gynt, S.N. 11,665, now Patent No. 3,128,403. By means of the compression rods the same mechanical pressure is produced between the spider arms and the rotor rim as that obtained when shrinking the rotor rim onto the rotor spider according to conventional methods. When, for example, lifting the turbine impeller up into the machine hall for overhaul, it is thus only necessary to free the rotor spider from the rim and lift it out. Rotor rim and poles need not be moved, which thus to a considerable degree reduces the required hoisting capacity of the crane. In order to obtain a fully satisfactory transmission of the torque between the rotor rim and the spider arms without the rotor rim being shrunk onto the rotor spider, vertical slots have been machined in the peripheral surface of the spider arms. Corresponding slots have been punched in the rim segments and both slots placed opposite each other. After the rotor spider has been set down on its location the slots in the spider arms and the corresponding slots in the rim are broached so that double wedges may be inserted and firmly driven in.

It is also feasible to use as fixture the base ring 14 of heavy plate. This must then, however, be provided with a number of tongues 15 (dotted in FIGURE 3), which for obtaining sufficient alignment accuracy must be machined, e.g. by turning, so that these tongues provide an annular location of desired accuracy around the rotor axis. This method requires however a continuous control of the stacking by means of an instrument in order that the rotor rim shall be cylindrical. The method is thus more time-consuming than described above, but has the advantage that the rotor rim may be stacked without the stator being in position. Of course it is also feasible for the beams 5 shown in the figures to be braced against the edge of the generator pit instead of the stator. With such a method of mounting the beams 5 it is thus possible to stack the rotor rim without the stator being in position.

I claim:

1. The method of building up a rotor of a large electrical generator of the vertical-shaft, turbine-driven type, comprising the steps of erecting a fixture having movable parts at the final site where the generator is to be placed, adjusting the parts of said fixture to have edges each lying in a vertical, straight, cylindrical surface, the axis of which is arranged to coincide with the desired axis of rotation of said rotor, then arranging sheet-like steel segments in layers on supporting means with the outer edges of said segments abutting said parts at said cylindrical surface to form a laminated rotor rim, pulling up said rotor rim with vertical bolts, then inserting a rotor spider in said rotor rim, securing said rotor rim to said rotor spider, and thereafter removing said fixture.

2. The method of building up a rotor of a large electrical generator of the vertical-shaft, turbine-driven type, comprising the steps of erecting a fixture having movable parts at the final site where the generator is to be placed, adjusting the parts of said fixture to have edges each lying in a vertical, straight, cylindrical surface, the axis of which is arranged to coincide with the desired axis of rotation of said rotor, then arranging sheet-like steel segments in layers on supporting means with the outer edges of said segments abutting said parts at said cylindrical surface to form a laminated rotor rim, pulling up said rotor rim with vertical bolts, then inserting a rotor spider in said rotor rim, said rotor spider comprising a boss and a plurality of rods of adjustable length extending between said rim and said boss, mounting said rotor rim in a pre-stressed condition on to said rotor spider by elongating said rods, and thereafter removing said fixture.

3. The method of building up a rotor of a large electrical generator of the vertical-shaft, turbine-driven type, comprising the steps of erecting a supporting means for said rotor at the final site where the generator is to be placed, adjusting a horizontal base ring on said supporting means, said base ring having vertical, upwardly projecting tongues having edges located in a vertical, straight, cylindrical surface, the axis of which is arranged to coincide with the desired axis of rotation of said rotor, then arranging sheet-like steel segments in layers on said base ring with the inner edges of said segments engaging said tongues and aligning with said cylindrical surface to form a laminated rotor rim, pulling up said rotor rim with vertical bolts, then inserting a rotor spider in said rotor rim, and securing said rotor rim on to said rotor spider.

4. The method of building up a rotor of a large electrical generator of the vertical-shaft, turbine-driven type, comprising the steps of erecting a supporting means for said rotor at the final site where the generator is to be placed, adjusting a horizontal base ring on said supporting means, said base ring having vertical, upwardly projecting tongues having edges located in a vertical, straight, cylindrical surface, the axis of which is arranged to coincide with the desired axis of rotation of said rotor, then arranging sheet-like steel segments in layers on said base ring with the inner edges of said segments engaging said tongues and aligning with said cylindrical surface to form a laminated rotor rim, pulling up said rotor rim with vertical bolts, then inserting a rotor spider in said rotor rim, said rotor spider comprising a boss and a plurality of rods with adjustable length extending between said rim and said boss, and afterwards mounting said rotor rim in a prestressed condition on to said rotor spider by elongating said rods.

References Cited

UNITED STATES PATENTS

| | | | |
|---|---|---|---|
| 502,988 | 8/1893 | Parshall | 29—155.53 |
| 2,060,260 | 11/1936 | Spengler | 29—155.53 |
| 2,568,479 | 9/1951 | Armstrong et al. | 29—155.53 |
| 3,077,026 | 2/1963 | Blackburn | 29—155.53 |

JOHN F. CAMPBELL, *Primary Examiner.*

J. W. BOCK, C. E. HALL, *Assistant Examiners.*